Dec. 19, 1944.  O. C. ECKEL  2,365,629
CLIP
Filed Sept. 9, 1943

Inventor.
Oliver C. Eckel
by Harold E. Cole
Attorney.

Patented Dec. 19, 1944

2,365,629

UNITED STATES PATENT OFFICE 2,365,629

CLIP

Oliver C. Eckel, Cambridge, Mass.

Application September 9, 1943, Serial No. 501,636

3 Claims. (Cl. 85—28)

This patent application is a continuation of my patent application Serial No. 475,929, filing date February 15, 1943.

This invention relates to clips suitable to hold an article, such as insulation in suspended position.

The principal object of my invention is to provide an inexpensive clip having a slender but strong penetrating portion that can be driven through a relatively dense or hard insulating material, such as cork board, for instance. Another object is to so construct said clip that its parts are extremely simple and can be assembled into permanent form with the minimum of labor.

A further object is to improve the means for attaching the penetrating portion to the base of the clip.

The foregoing and other objects which will appear as the nature of the invention is better understood, may be accomplished by a construction such as is disclosed by the drawing and specification. The nature of the invention is such as to render it susceptible to various changes and modifications, and, therefore, I am not to be limited to said disclosure; but am entitled to all such changes therefrom as fall within the scope of my claims.

Figure 1:
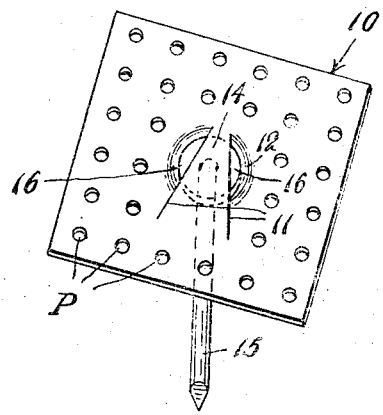
Figure 1 is a perspective view of my clip looking at the underside of the base.
Figure 2:
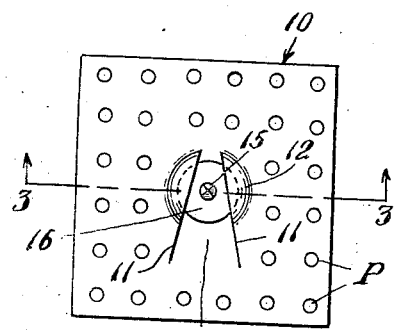
Figure 2 is a bottom view thereof.
Figure 3:
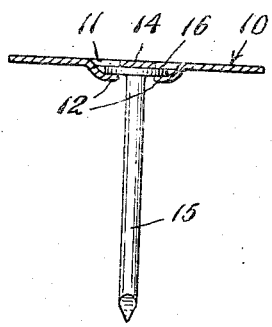
Figure 3 is a sectional view on the line 3—3 of Figure 2.

As illustrated my clip has a base 10 that is preferably flat and of sheet metal with perforations P therein. Two slits or openings 11 are made in said base, which preferably converge towards the center of said base and slightly beyond, or wherever the head of the shank pin, later described, is set. Said slits 11 are formed by slitting through and forcing portions of said base 10 to offset position which thereby provide retaining covers or offset portions 12 which, as shown in Figure 2 of the drawing, appear in the form of segments of a circle. Between said slits 11 is a supporting strip 14 which is part of said base 10.

The penetrating shank of my clip has a pin member 15 and an enlarged head 16, preferably flat on both its face surfaces and round at its edge. Said head 16 is slid into place on said base 10 between said two slits 11 and bears against said supporting strip 14 of said base. When it reaches a position under said retaining covers 12, the latter are preferably pounded down on said head 16 to lock it in place.

Figure 5:
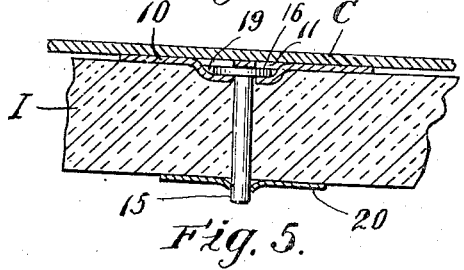
Figure 5 is a sectional view showing my clip united to a ceiling, and holding insulation in place with the aid of a washer.

In actual use said base 10 is adhesively united to a ceiling C or wall, and said pin member 15 extends through insulation I as shown in Figure 5 of the drawing. A washer 20 may be forced onto said pin member 15 to retain said insulation I in position. The pointed end of said pin member 15 may be snipped off as shown in said Figure 5.

Figure 4:
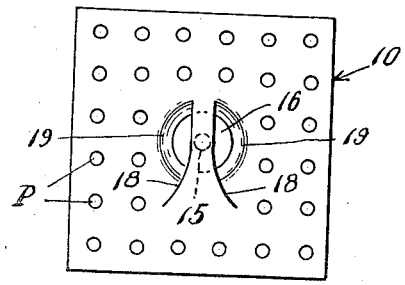
Figure 4 is a bottom view of a modified form of my clip.

In Figure 4 a modified form of my clip is shown in which the base 10 has slits 18 that extend through and beyond the center of said base in parallel straight lines, hence an equal distance apart, and then curve outwardly towards an outside edge of said base.

What I claim is:

1. A clip comprising a base and a shank, said shank embodying a pin member and an enlarged head, said base having slits therein and having two side portions adjacent said slits and offset from said base, said head being between said slits and under said offset portions and below said base.

2. A clip comprising a base and a shank, said base having perforations therein spaced from the center portion thereof, said shank embodying a pin member and an enlarged head, said base having two slits therein that converge towards each other within said unperforated, center portion, and having two side portions offset from said base opposite said slits and within said unperforated, center portion, said head being between said slits and under said offset portions and below said base.

3. A clip comprising a base and a shank, said shank embodying a pin member and an enlarged head having a flat under surface, said base having slits therein extending less than one-half the same directional width of said base, said base having a central portion between said slits extending in the same plane as the main portion of said base and having two side portions opposite said slits and offset from said base, said head being between said slits and under said offset portions and bearing against said central portion.

OLIVER C. ECKEL.